(12) United States Patent
Milicevic et al.

(10) Patent No.: US 7,522,800 B2
(45) Date of Patent: Apr. 21, 2009

(54) METHOD FOR THE PRODUCTION OF AN OPTICAL FIBRE, PREFORM, AND AN OPTICAL FIBRE

(75) Inventors: Igor Milicevic, Helmond (NL); Frans Gooijer, Eindhoven (NL); Eric Aloysius Kuijpers, Eindhoven (NL); Dennis Robert Simons, Eindhoven (NL); Rob Hubertus Matheus Deckers, Eindhoven (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/414,376

(22) Filed: May 1, 2006

(65) Prior Publication Data

US 2006/0193581 A1 Aug. 31, 2006

Related U.S. Application Data

(62) Division of application No. 10/846,637, filed on May 17, 2004, now Pat. No. 7,068,899.

(30) Foreign Application Priority Data

May 15, 2003 (NL) .................................. 1023438

(51) Int. Cl.
G02B 6/02 (2006.01)

(52) U.S. Cl. ..................................... 385/123

(58) Field of Classification Search ....................... None
See application file for complete search history.

(56) References Cited

U.S. PATENT DOCUMENTS

| | | | |
|---|---|---|---|
| 4,331,462 A | 5/1982 | Fleming, Jr. et al. |
| 4,741,747 A | 5/1988 | Geittner et al. |
| 4,857,091 A | 8/1989 | Geittner et al. |
| 4,944,244 A | 7/1990 | Moisan et al. |
| 5,145,509 A | 9/1992 | Bachmann et al. |
| 5,188,648 A | 2/1993 | Geittner et al. |
| 5,578,106 A | 11/1996 | Fleming et al. |
| 6,502,428 B1 * | 1/2003 | Onishi et al. ................... 65/378 |
| 6,523,368 B2 | 2/2003 | Lee et al. |
| 6,532,773 B1 * | 3/2003 | Mazzarese et al. ............ 65/378 |
| 7,068,899 B2 | 6/2006 | Milicevic et al. |
| 2003/0124250 A1 | 7/2003 | House et al. |
| 2006/0193581 A1 | 8/2006 | Milicevic et al. |

FOREIGN PATENT DOCUMENTS

| | | |
|---|---|---|
| EP | 0 038 982 | 11/1981 |
| EP | 0 209 945 | 1/1987 |
| EP | 0 333 580 | 9/1989 |
| EP | 1622841 | 11/2004 |
| GB | 2 118 165 | 10/1983 |
| WO | WO 03/054245 | 7/2003 |
| WO | 2004101458 A1 | 11/2004 |

OTHER PUBLICATIONS

T. Hünlich, et al., Journal of Optical Communications, vol. 8, No. 4, XP-002267374, pp. 122-129, "Fiber-Preform Fabrication Using Plasma Technology: A Review", Dec. 1987.
European Office Action for counterpart European Application No. 04732858, dated Jan. 29, 2008.
Translation of Chinese First Office Action for counterpart Chinese Application No. 200480013303.1, dated Mar. 23, 2007.
Translation of Chinese Second Office Action for counterpart Chinese Application No. 200480013303.1.
International Search Report for corresponding International Application No. PCT/NL2004/000326.

* cited by examiner

*Primary Examiner*—Sung H Pak
(74) *Attorney, Agent, or Firm*—Summa, Additon & Ashe, P.A.

(57) ABSTRACT

A preform for manufacturing an optical fibre or an optical fiber, where the variation in the refractive index contrast of the preform does not exceed an absolute value of 2%, measured for a preform having a length of at least 60 cm, or the deviation of the preform in relation to the average value of the profile parameter α does not exceed an absolute value of 0.03, measured for a preform having a length of at least 80 cm. The optical fibre has a deviation from the average value of the profile shape parameter α of maximally about 0.03.

21 Claims, 10 Drawing Sheets

METHOD FOR THE PRODUCTION OF AN OPTICAL FIBRE, PREFORM, AND AN OPTICAL FIBRE

CROSS REFERENCE TO RELATED APPLICATIONS

This application is a divisional of U.S. application Ser. No. 10/846,637, filed May 17, 2004, and is based upon and claims priority under 35 U.S.C. §119 from Dutch Patent Application No. 1023438, filed May 15, 2003, each of which is incorporated by reference herein in their entirety.

FIELD OF THE INVENTION

The present invention relates to a method of manufacturing an optical fibre, which method comprises the following steps:
 i) providing a hollow substrate tube,
 ii) passing doped or undoped reactive, glass-forming gases through the interior of the hollow substrate tube,
 iii) creating such conditions in the interior of the hollow substrate tube that deposition of glass layers onto the interior of the hollow substrate tube takes place, wherein a non-isothermal plasma is reciprocated between two reversal points along the substrate tube, wherein the velocity of movement of the plasma decreases to zero from each deceleration point to each reversal point,
 iv) subjecting the substrate tube thus obtained to a collapsing treatment so as to form a solid preform, and
 v) drawing an optical fibre from said solid preform.

In addition to that, the present invention relates to a preform for manufacturing an optical fibre, as well as to an optical fibre.

Using the present invention, preforms for optical fibres are produced by means of an internal chemical vapour deposition technique (CVD), which process involves the deposition of doped or undoped reactive, glass-forming gases on the inside of a hollow substrate tube. Such reactive gases are supplied on one side of the substrate tube, viz. the entrance side, forming a glass layer on the interior of the substrate tube under the influence of special process conditions. An energy source is reciprocated along the substrate tube so as to form a glass layer. The energy source, in particular a plasma generator, supplies high-frequency energy, as a result of which a plasma is generated in the interior of the substrate tube, under which plasma conditions the reactive, glass-forming gases will react (the plasma CVD technique). It is also possible, however to supply the energy by means of heat, in particular by using burners, on the outer side of the substrate tube or via a furnace that surrounds the substrate tube. A common feature of the aforesaid techniques is the fact that the energy source is reciprocated with respect to the substrate tube.

BACKGROUND OF THE INVENTION

A drawback of the techniques described above is the fact that the reciprocating movement of the energy source may lead to defects being introduced into the deposited layers at the reversal points. Such defects are called "taper", in which connection a distinction is furthermore made between geometric taper and optical taper. The term geometric taper is to be understood to mean that the thickness of the total deposition, viz. all glass layers, is not constant over the length of the tube. The term optical taper is to be understood to mean that the optical properties, which properties are mainly determined on the fibre that is eventually drawn, are not constant over the length of the preform. Optical taper is to a certain extent caused by variations in the layer thickness, but it is mainly determined by variations in the refractive index, or refractive index profiles, along the length of the preform. To achieve an adequate control of the optical properties of the fibres to be produced, an adequate control of the geometric taper is required, but in addition to that the variations in the refractive index contrast Δ should be as small as possible over the greatest possible length of the preform.

Taper has this drawback that the useful length of the preform is limited, which means that a smaller amount of fibre can be obtained from one preform. In addition to that, the properties of an optical fibre may not be constant over the length of the fibre as a consequence of said taper. It may furthermore be mentioned in this connection that if the optical properties of a fibre of great length are not sufficiently constant due to the presence of taper, the manufacturer will have to give certain guarantees with regard to the issued product certificate; in principle each individual part of the optical fibre must be in conformity with the provided specification at all times, in particular if the optical properties are re-measured, for example by the user.

U.S. Pat. No. 4,741,747 relates to a method of manufacturing optical fibres, wherein the so-called end taper is reduced by moving the plasma nonlinearly as a function of time in the region of the reversal point and/or by varying the intensity of the plasma along the length the glass tube.

U.S. Pat. No. 4,857,091 relates to a method of manufacturing optical fibres, in which a number of parameters are mentioned that influence the axial position of the local deposition zone with respect to the plasma generator, which parameters include:
 (i) periodically varying the microwave power,
 (ii) periodically varying the pressure in the substrate tube, and
 (iii) periodically varying the stroke velocity of the resonator being reciprocated over the tube. Further details regarding i)-iii) are altogether lacking.

European patent application No. 0 038 982 relates to a method of manufacturing optical fibres wherein the plasma generator is moved along the substrate tube, which plasma generator produces a hot zone such that the hot zone can be considered as a so-called "tandem hot zone" which includes at least two zones, viz. zone I and zone II. Although it is mentioned in said document that deposition rates or deposition compositions can be changed so as to prevent the occurrence of so-called taper ends, it is not indicated in said document what specific operations such a treatment involves.

European patent application No. 0 333 580 relates to a device for manufacturing preforms for optical fibres in which a variable power microwave generator is used, in which no use is made of a non-isothermal plasma which is reciprocated between two reversal points along the substrate tube, however.

International application WO 03/054245, which was filed earlier but published later, relates to a special PCVD technique for producing preforms; no information is provided in said document with regard to varying the velocity at which the plasma is moved along the hollow substrate tube.

From British patent publication GB 2 118 165 there is known a method of manufacturing an optical fibre in which the velocity of the heat source being moved axially along the substrate tube is in accordance with a specific mathematical equation, wherein the velocity of said heat source along the tube is a function of the position of said heat source along the substrate tube, so that the total deposition thickness of the glass layers is substantially constant over the length of the tube.

From U.S. Pat. No. 5,188,648 to the present applicants there is known a method of manufacturing optical fibres wherein the movement of the plasma is interrupted each time the plasma reaches the reversal point near the gas entry point of the substrate tube, whilst the glass deposition continues, wherein the period during which the plasma movement is interrupted is at least 0.1 second.

SUMMARY OF THE INVENTION

The object of the present invention is thus to provide a method of manufacturing a preform from which an optical fibre can be drawn, which preform exhibits little geometric and optical taper.

Another aspect of the present invention is to provide a preform from which an optical fibre can be drawn, which preform exhibits optical properties which are constant over the greatest possible length.

Another aspect of the present invention is to provide an optical fibre in which the deviation from the average value of the profile shape parameter $\alpha$, measured over a specific longitudinal fibre, remains within a precisely defined range.

The present invention as referred to in the preamble is characterized in that the velocity at which the plasma is moved along the hollow substrate tube is changed in a first end region adjacent to a reversal point during step iii), both as a function of time in the deposition process and as a function of position in the first end region, which change marks the starting point of the first end region, wherein the end point of the first end region coincides with the reversal point and wherein the starting point is located further away from the reversal point than the deceleration point, said first end region having a length that suffices to reduce the taper in the preform.

One or more of the objects of the present invention can be accomplished by using the aforesaid method. More specifically, according to the present invention not only a specific variation in a specific process parameter along the length or at certain positions of the substrate tube is effected for reducing the optical taper, which feature is extensively described in the prior art as discussed above, but in addition to that a variation of said adaptation in time must be effected, in which connection time is to be understood to be the period during which the deposition of the glass layers takes place. The process parameters by means of which such a reduction of the optical taper can be effected are: i) the velocity at which the plasma generator is moved with respect to the substrate tube, ii) the power supplied to the plasma generator, iii) the amount and the composition of the doped or undoped reactive, glass-forming gases that are supplied to the interior of the hollow substrate tube, and iv) the pressure that prevails in the substrate tube.

At the beginning of step iii), the velocity at which the plasma is moved along the hollow substrate tube in the first end region is therefore preferably lower at all positions than the velocity at which the plasma is moved along the hollow substrate tube outside the end region, and at the end of step iii) velocity values are reached which are higher than the velocity at which the plasma is moved along the hollow substrate tube outside the first end region, in which connection especially the velocity of the plasma in the first end region increases linearly in time. The aforesaid first end region is located at the end of the hollow substrate tube, where the supply of reactive, glass-forming gases according to step ii) takes place. A special embodiment will be explained in more detail in the discussion of the figures.

To produce a preform having the greatest possible useful length, it is desirable to effect a reduction of the taper at both ends of the preform, in which connection it is preferable to change the velocity at which the plasma is moved along the hollow substrate tube in a second end region adjacent to a reversal point during step iii), both as a function of time and as a function of position in the second end region, which change marks the starting point of the second end region, with the end point of the second end region coinciding with the reversal point and the starting point being located further away from the reversal point than the deceleration point, which second end region is sufficiently long for reducing the taper in the preform.

In order to effect a taper reduction in the second end region, the velocity at which the plasma is moved along the hollow substrate tube in the second end region is preferably lower at all positions at the beginning of step iii) than the velocity at which the plasma is moved along the hollow substrate tube outside the end region, which velocity has further decreased at the end of step iii), which second end region is in particular located at the end of the hollow substrate tube, where the discharge of reactive, glass-forming gases according to step ii) takes place.

In order to deposit a large amount of glass at a particular position, seen in the axial direction of the substrate tube, at the beginning of the deposition process and a small amount of glass at the end of the deposition process, the velocity preferably decreases linearly during step iii) as a function of time in the second end region. It is in particular advantageous if the first end region comprises a length of 5-35% of the total length of the hollow substrate tube between the two reversal points, with the second end region comprising a length of 1-10%.

The method according to the present invention is further characterized in that the power of the plasma and the velocity at which the plasma moves between the two reversal points along the hollow substrate tube is maintained at a substantially constant value during step iii), with the plasma power being changed as a function of time in an end region adjacent to a reversal point, which change marks the starting point of the end region, which plasma power is lower, preferably at least 2%, in particular at least 5%, than the plasma power outside the end region at the beginning of step iii), and is gradually increased as a function of time to a plasma power having a value which, at the end of step iii), is higher, preferably at least 2%, in particular at least 5%, than the plasma power in the region outside the end region, in which connection it is in particular desirable for the end region to be located at the end of the hollow substrate tube, where the supply of reactive, glass-forming gases according to step ii) takes place.

The present invention is further characterized in that the supplied amount of reactive, glass-forming gases according to step iii) is maintained at a substantially constant value along the length of the hollow substrate tube between the two reversal points, with the composition of the reactive, glass-forming gases being changed as a function of time in an end region adjacent to a reversal point, which change marks the starting point of the end region.

In a special embodiment, the velocity at which the plasma is moved along the hollow substrate tube between the two reversal points is maintained at a substantially constant value, with the pressure in the hollow substrate tube being changed as a function of time in an end region adjacent to a reversal point, which change marks the starting point of the end region.

Using the present method, optical fibres can be manufactured, which optical fibres of the graded index type have a light-guiding optical core whose refractive index is preferably in accordance with the following equation:

$$n(r) = n_1[1 - 2\Delta(r/a)^\alpha]^{1/2}$$

wherein:
$n_1$=the refractive index value of the fibre core,
r=the radial position in the fibre (μm),
$\Delta$=the refractive index contrast of the fibre (=$(n_1^2 - n_{cl}^2)/2n_1^2$),
$n_{cl}$=the refractive index of the cladding surrounding the core,
α=the profile shape parameter, and
a=the radius of the graded index core (μm).

The profile parameter α determines the curvature of the gradient profile; in the case of an α-value of 1 the profile is triangular and in the case of an infinite α-value the profile is rectangular. The aforesaid α-value has a great influence on the pulse widening of a light pulse being transmitted through the optical fibre, and consequently also on the transmission capacity of such a multimode optical fibre. In order to prevent major variations in the transmission capacity of the optical fibres, the deviation in relation to the average value of the profile shape parameter α is preferably maximally ±0.03, or less, over a length of at least 10 km. More preferably, the deviation in relation to the average value of the profile shape parameter α is maximally ±0.015 for an optical fibre having a length of at least 10 km.

The present invention further relates to a preform for manufacturing an optical fibre, which is characterized in that the variation in the refractive index contrast does not exceed an absolute value of 2%, measured for a preform having a length of at least 60 cm, more in particular, that the variation in the refractive index contrast does not exceed an absolute value of 1.5%, measured for a preform having a length of at least 60 cm.

The present invention further relates to a preform for manufacturing an optical fibre, wherein the deviation in relation to the average value of the profile parameter α does not exceed an absolute value of 0.03, measured for a preform having a length of at least 80 cm, more particularly, wherein the deviation in relation to the average value of the profile parameter α does not exceed an absolute value of 0.015, measured for a preform having a length of at least 80 cm.

The present invention will now be explained in more detail by means of a number of examples, in which connection it should be noted, however, that the present invention is by no means limited to such special examples.

DETAILED DESCRIPTION OF THE INVENTION

Comparative Example 1

Figure 1:
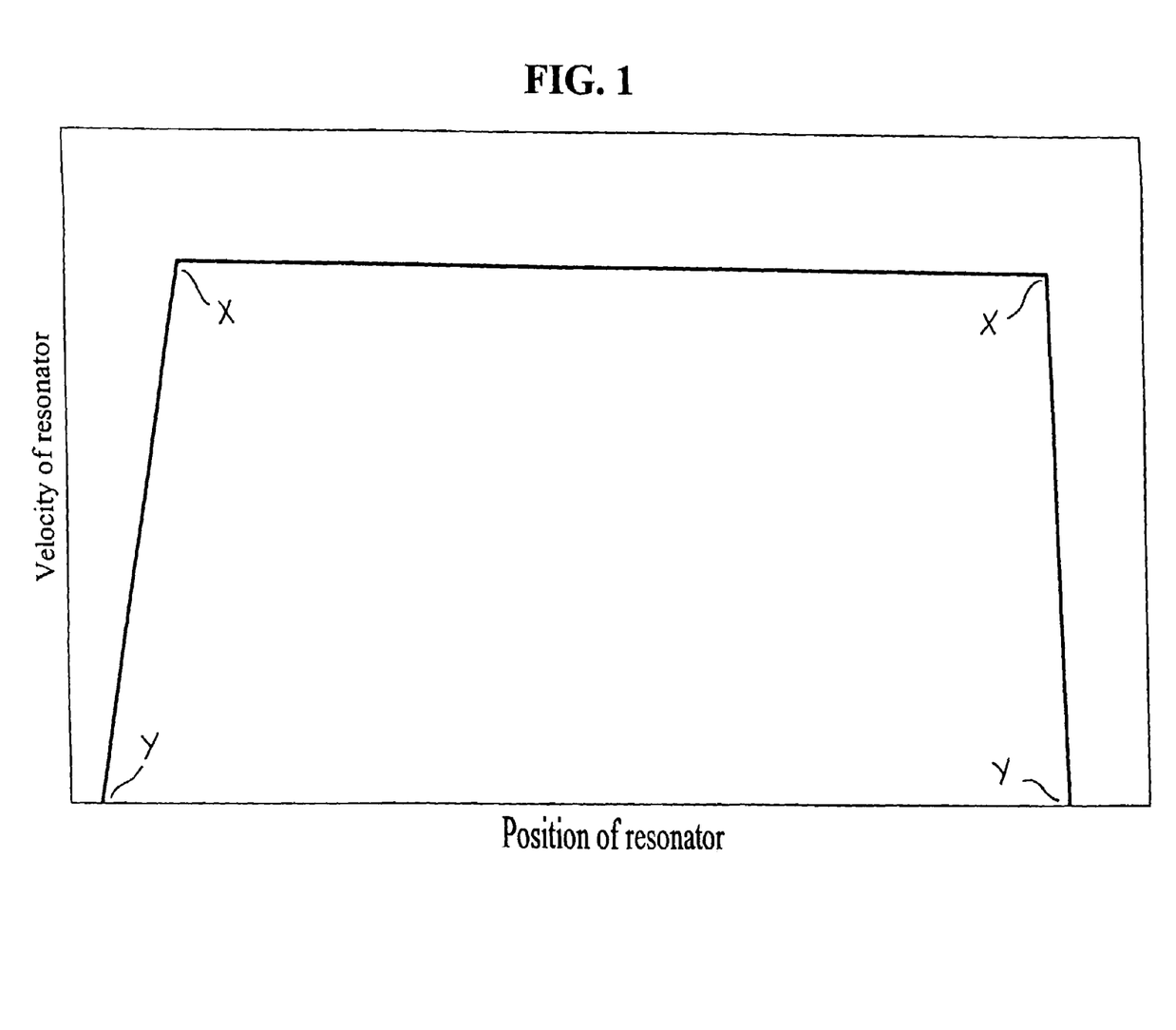
FIG. 1 shows a velocity profile of a PCVD process in which said profile was maintained at a constant value during the entire deposition process.

Using the PCVD technique, a preform was produced from which a graded index-type optical fibre having a refractive index contrast of about 0.02 was drawn. Glass layers were deposited on the inside of the substrate tube by having reactive, glass-forming gases flow into the substrate tube on one side and subsequently cause said gases to react, using a plasma generated inside the substrate tube. A plasma generator or resonator surrounding the substrate tube was used for coupling the required high-frequency energy into the plasma. Said plasma generator was reciprocated at a constant velocity along the substrate tube, with the velocity linearly decreasing to 0 from the deceleration point x to the reversal points Y. This velocity profile, which was maintained at a constant value during the deposition process, is shown in FIG. 1. After the deposition process, the substrate tube was contracted into a solid preform in a usual manner. The refractive index profile was measured at various positions along the preform thus formed, using a so-called index profiler type Photon Kinetics model 2600. The changes in the core diameter, the maximum Δ-value and the profile parameter α are schematically shown in the appended FIGS. 3-5, respectively. FIG. 4 clearly shows that the maximum preform length at which the variations in the refractive index contrast do not exceed a value of ±1% is about 60 cm. The maximum preform length at which the variations in the refractive index contrast do not exceed a value of ±0.5% is about 40 cm.

Example 1

Figure 2:
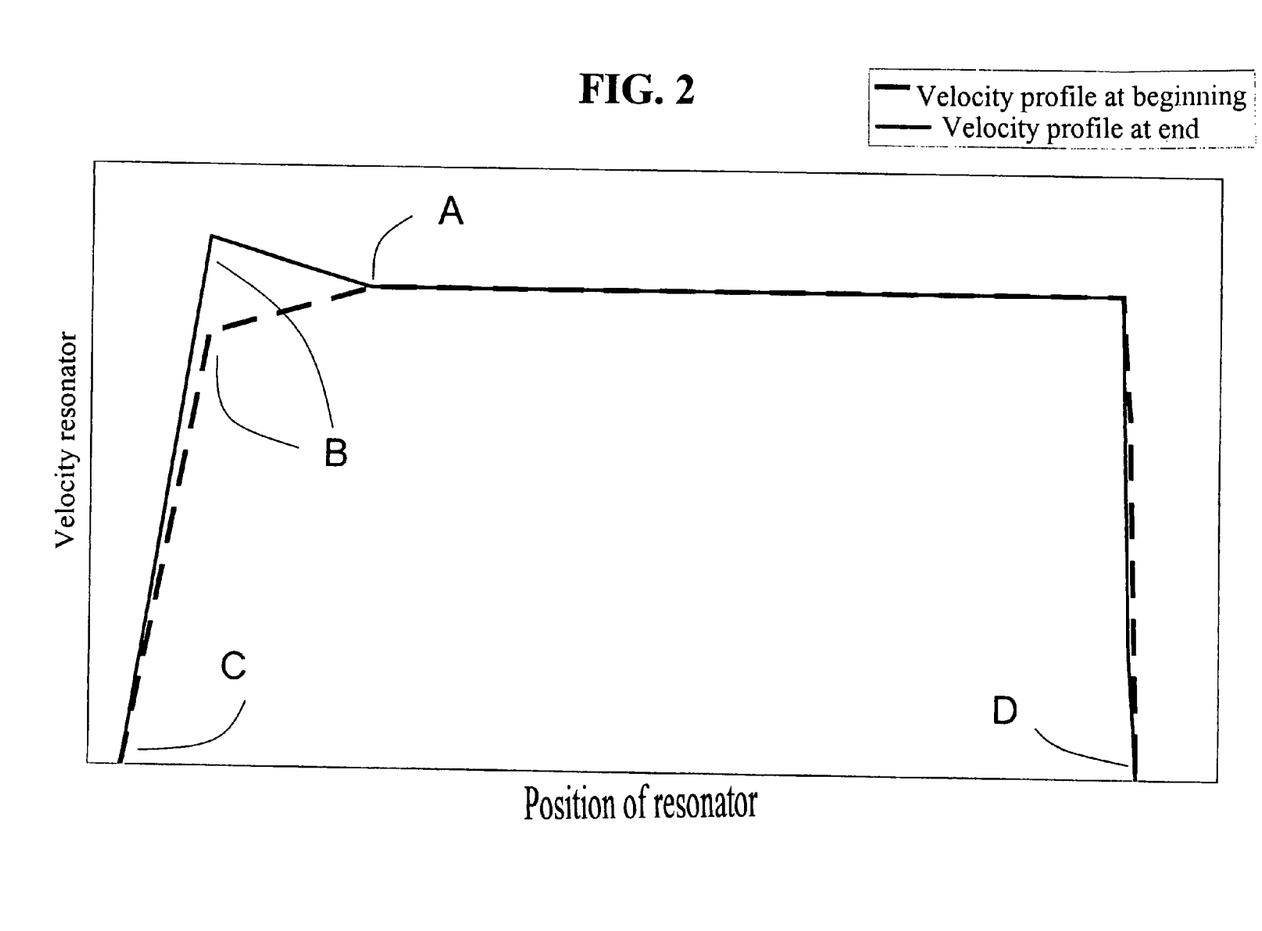
FIG. 2 shows a velocity profile with which the plasma generator is moved axially along the substrate tube.

Using the PCVD technique described in Comparative Example 1, a preform was produced from which a graded index-type optical fibre having a refractive index contrast of about 0.02 was drawn, wherein according to the present invention the velocity profile with which the plasma generator was moved axially along the substrate tube was varied in time. The velocity profile with which the plasma generator is moved axially along the substrate tube is schematically shown in FIG. 2, namely at the beginning of the deposition process and at the end of the deposition process. It is apparent from FIG. 2 that the method according to the present invention has been used at the end of the substrate tube, where the reactive, glass-forming gases are supplied, during the entire deposition process and that the velocity profile of the plasma generator decreases towards point B. In FIG. 2 a number of characteristic points are indicated, with point A, viz. the starting point of the first end region, marking the position at which the velocity profile of the plasma generator is no longer maintained at a constant value and is decreased to point B (the left-hand side in the figure) so as to decrease the intended optical taper. Said point B is thus located in the first end region and marks the deceleration point, or the position at which the plasma generator is decelerated until the velocity has decreased to zero at the reversal point. Point C, viz. the end point of the first end region, marks the reversal point (velocity=0) of the plasma resonator at the end of the substrate tube, where the reactive, glass-forming gases flow into the substrate tube, with point D (velocity=0) marking the reversal point located at the other end of the substrate tube. The length of the end region, marked A-C, amounted to 24% of the distance between the two reversal points, marked C-D. It is apparent that the deceleration point is located in the first end region, and that the starting point A is located further away from the reversal point than the deceleration point B. From FIG. 2 it follows that the velocity profile already exhibits a deviation from the velocity profile of Comparative Example 1 as shown in FIG. 1 at the beginning of the deposition process, viz. near point A. In other words, at the beginning of the deposition process the resonator velocity in the end region A-C is lower than the velocity profile according to FIG. 1, and said resonator velocity will gradually increase along the section A-B during the deposition process to a value higher than the resonator velocity as used in the region to the right of the starting point A during the entire deposition process. The region located between the end point C and the starting point A is also called the end region. Thus it is apparent that the length of the end region A-C is greater than that of the region X-Y as shown in FIG. 1. By selecting a lower velocity in the first end region, in particular for the region A-B, at the beginning of the deposition process already and having said velocity increase linearly during the deposition process, an optical preform will be obtained which exhibits better results as regards core diameter and deviation.

Figure 3:
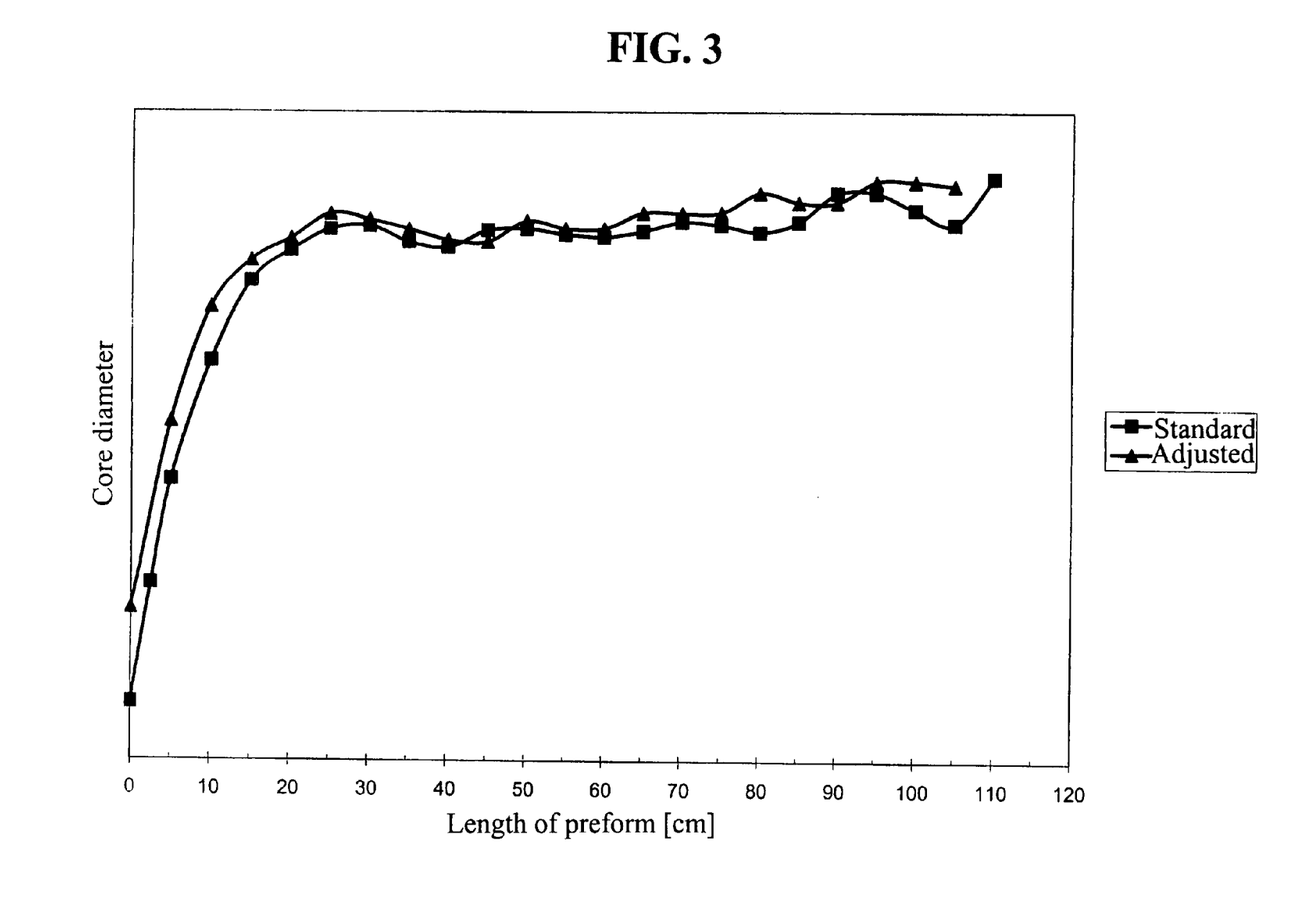
FIGS. 3-5 show refractive index profiles in which the changes in the core diameter are represented as the length of the preform in FIG. 3.
Figure 4:
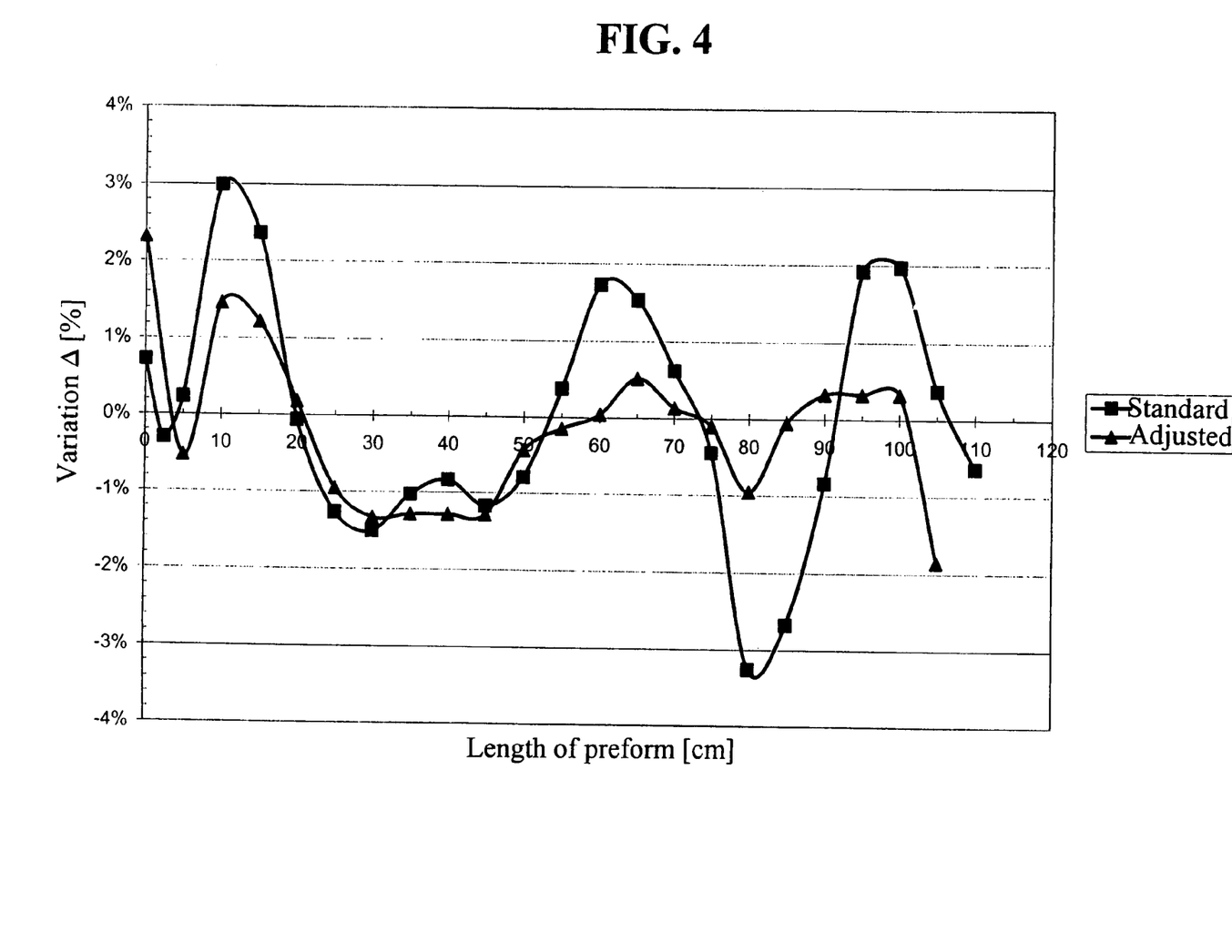
Figure 5:
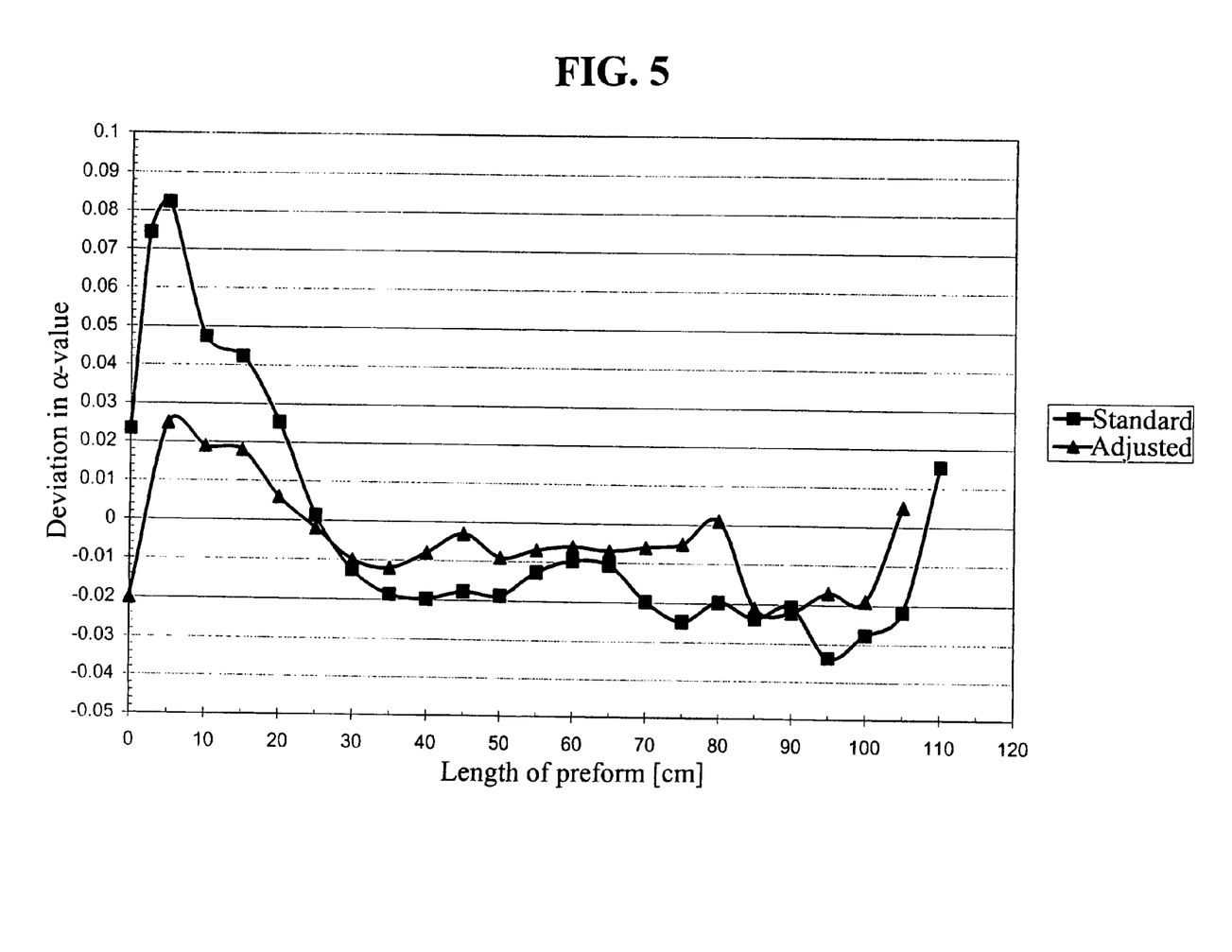

The refractive index profile of the preform thus obtained was measured at various positions, using the same index profiler as used in Comparative Example 1, with the changes in the core diameter being represented as the length of the preform in FIG. 3, the deviation $\Delta$ (%) being represented as a function of the length of the preform in FIG. 4, and finally the deviation in relation to the average the $\alpha$-value being represented in FIG. 5 as a function of the length of the preform. From said FIGS. 3-5 it is apparent that the preform according to Example 1 provides significantly better results than the preform according to Comparative Example 1.

Example 2

Figure 6:
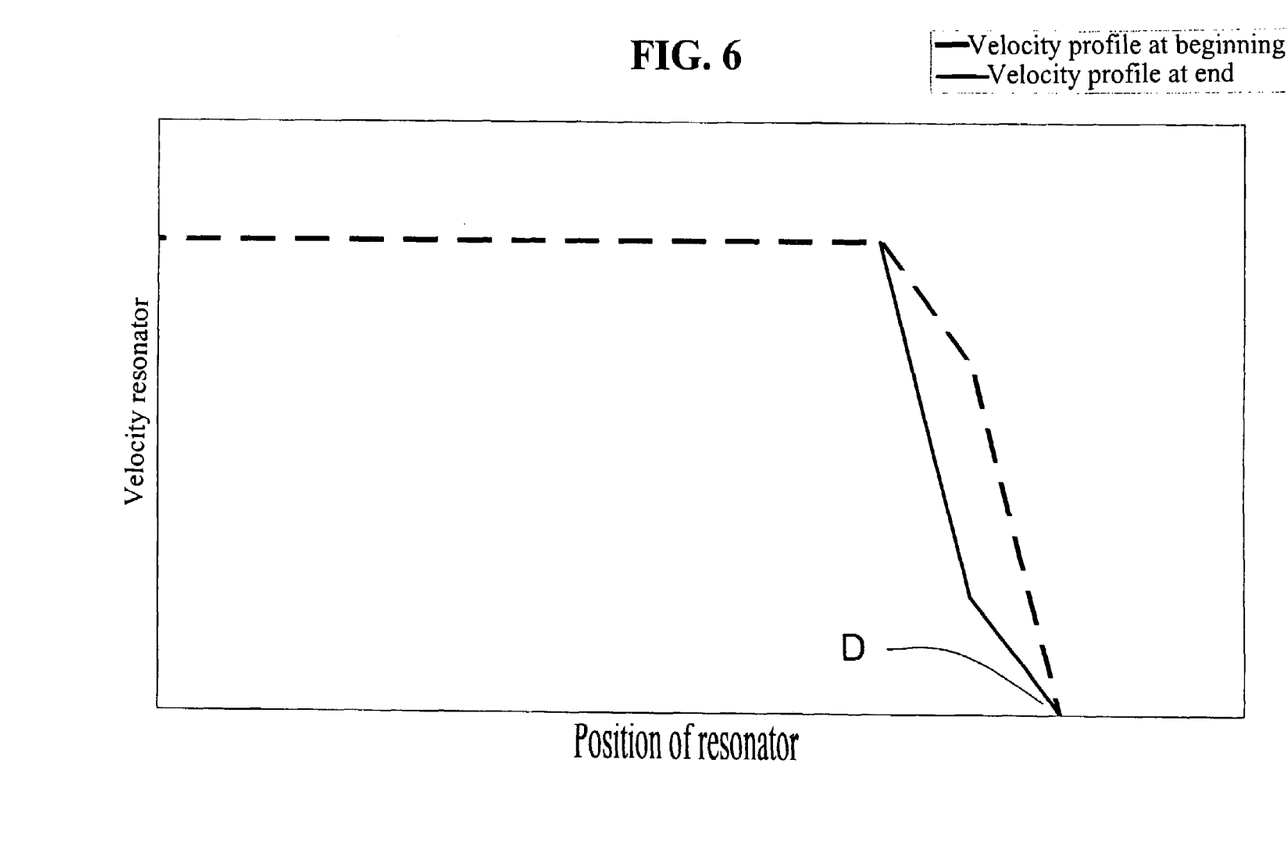
FIG. 6 shows the velocity profile only at the end of the substrate tube, that the gases exits the interior of the substrate tube.
Figure 7:
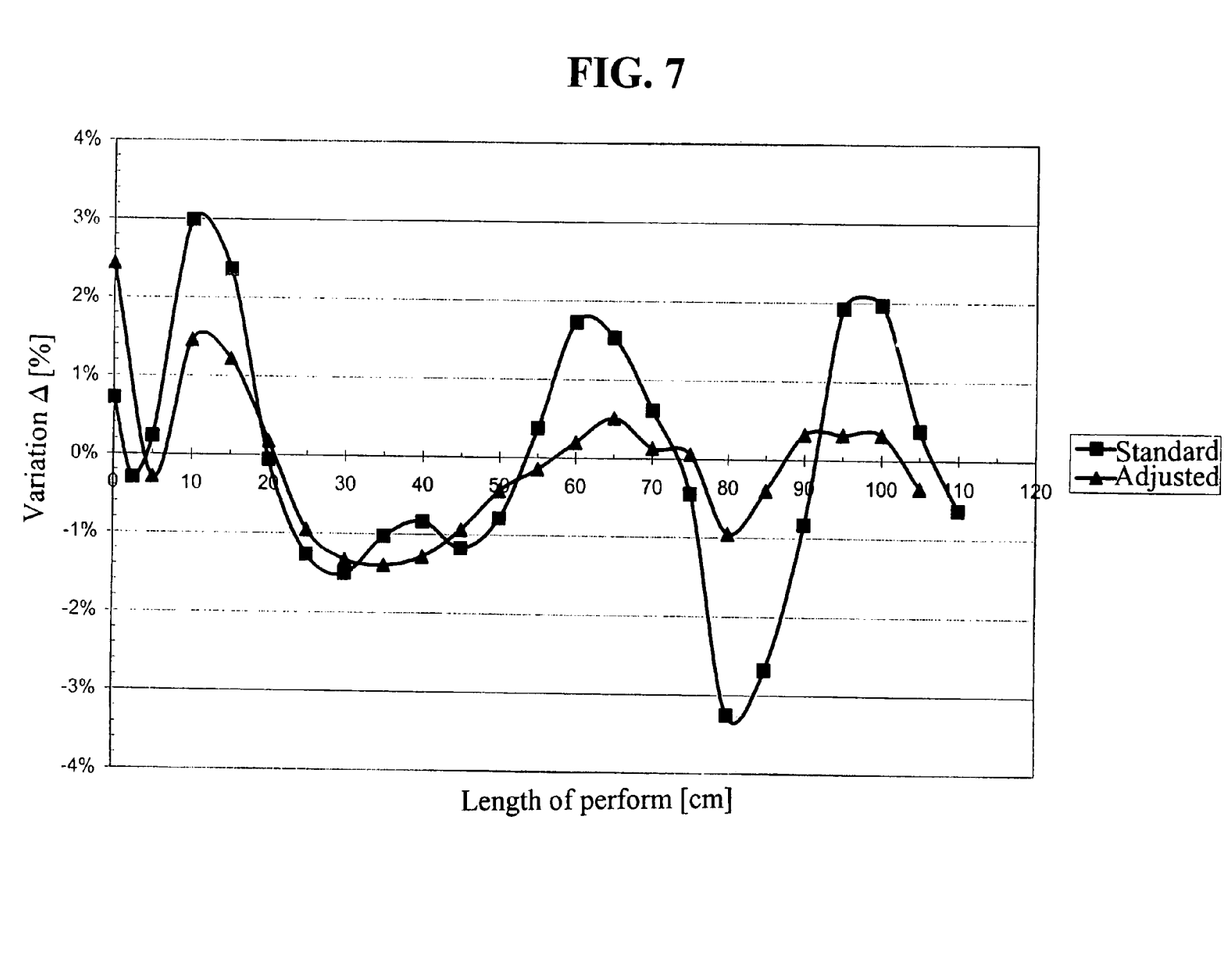
FIGS. 7 and 8 show the variations of the maximum Δ and the profile shape parameter α.
Figure 8:
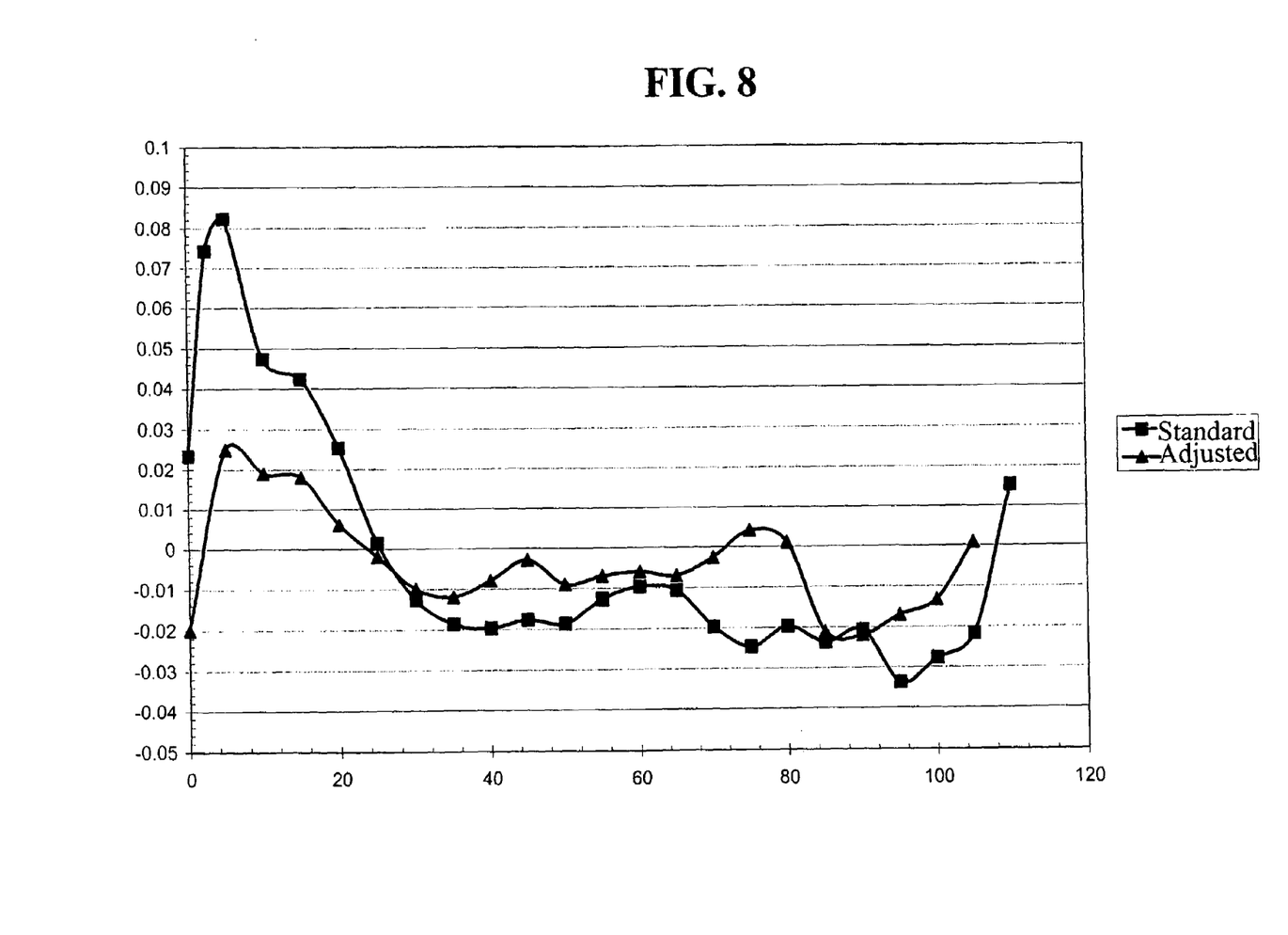

Using the PCVD technique described in Comparative Example 1 and Example 1, a preform was produced from which a graded index-type optical fibre having a refractive index contrast of about 0.02 was drawn. During the deposition process, the velocity profile of the plasma generator was varied as a function of time and of position; in Example 2, however, the profile was varied both at the left-hand end of the substrate tube, viz. the end at which the glass-forming components enter, and at the right-hand end of the substrate tube, viz. the end at which the glass-forming components exit. The variation as a function of time during the deposition process and position at the end where the reactive, glass-forming gases enter the hollow substrate tube corresponds to the velocity profile as shown in FIG. 2. The velocity profile only at the end of the substrate tube at which the gases exit the interior of the substrate tube is schematically shown in FIG. 6. FIG. 6 thus shows the velocity profile at the beginning of the deposition process and the velocity profile at the end of the deposition process, and it is apparent from said figure that at the end of the deposition process the velocity profile is significantly slower than at the beginning. From point E, which point marks the starting point of the second end region, the resonator velocity is reduced as a function of position, which change is significantly different from the known resonator velocity profiles shown in FIG. 1. At a position F, viz. the deceleration point of the resonator, the velocity of the resonator is reduced to zero at the reversal point D, which point D marks the end point of the second end region. Subsequently, the velocity of the resonator is reduced even further in the second end region E-D during a further stage of the deposition process. The length of the end region at the right-hand reversal point, marked E-D, amounted to 1.5% of the distance between the two reversal points, marked C-D, wherein C is the left-hand reversal point (not shown). It should be understood that the deceleration point F is located in said second end region E-D, which second end region is larger than the region X-Y as shown in FIG. 1; in other words, according to the profile as shown in FIG. 6, the resonator velocity will be lower than the resonator velocity according to FIG. 7 at position E already. The preform thus produced has been subjected to a number of measurements, in which the refractive index profile was measured at various positions along the preform, using the same index profiler as in Example 1 and Comparative Example 1. The variations in the maximum $\Delta$ and the profile shape parameter $\alpha$ are schematically represented in FIGS. 7 and 8, which figures clearly show that the preform according to Example 2 provides significantly better results than the preform according to Comparative Example 1.

Example 3

Figure 9:
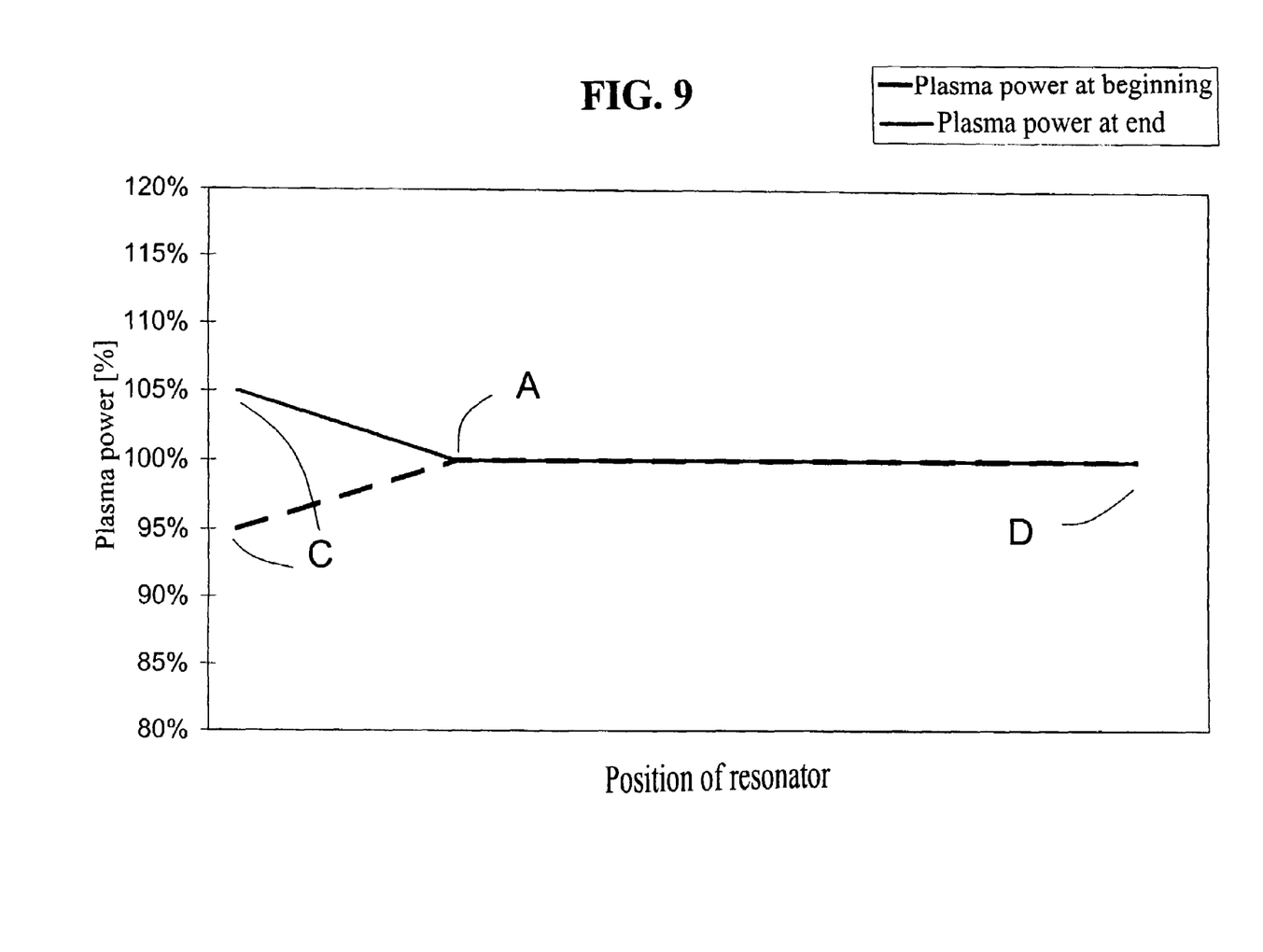
FIG. 9 shows the power of the supplied microwave energy as a function of the position of the plasma generator.

Using the PCVD technique as discussed above, a preform was produced, wherein the power of the supplied microwave energy was varied at the location of the end of the substrate tube, where the doped or undoped reactive, glass-forming gases were introduced. The velocity profile of the plasma generator that was used corresponds to the velocity profile as shown in FIG. 1. FIG. 9 schematically shows the power of the supplied microwave energy as a function of the position of the plasma generator; at the beginning of the deposition process the supplied power was reduced in the region to the left of position A to a value 5% below the nominal volume in comparison with the region to the right of position A. The power level of the supplied microwave energy was adjusted during the deposition process, with the power gradually increasing to a value 5% above the nominal value at the end of the deposition process, in dependence on the position of the plasma generator. It has become apparent that when such a method is used, the optical taper can be reduced in comparison with the method as described in Comparative Example 1, viz. an embodiment in which no adjustment of the plasma power was carried out either as a function of time or as a function of position.

Example 4

Figure 10:
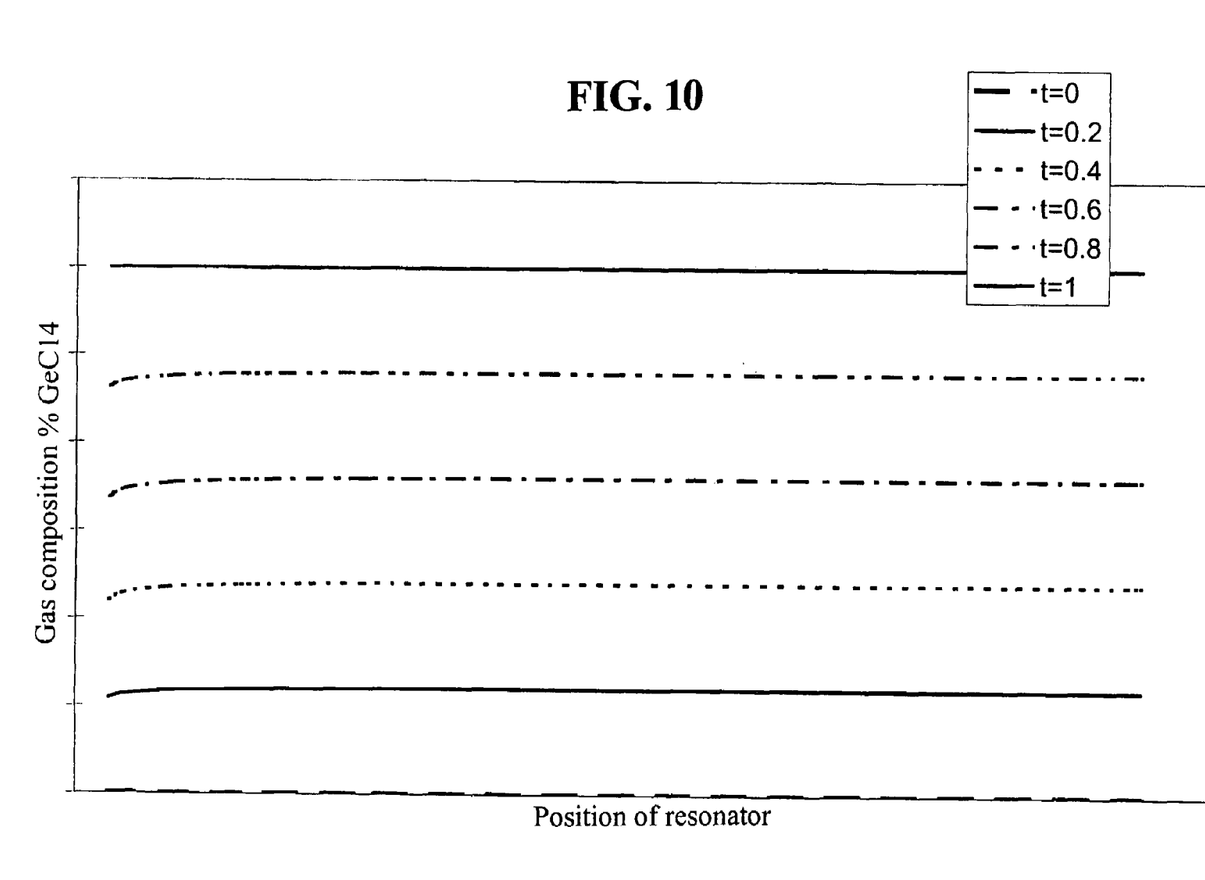
FIG. 10 shows the change of a gas composition in a PCVD process during the deposition process.

Using the PCVD technique as described above, a preform for a graded index-type optical fibre having a refractive index contrast of about 0.02 was produced, wherein it was the ratio between the reactive, glass-forming gases, in particular the ratio between the supplied amount of $GeCl_4$ and $SiCl_4$, that was varied in the course of the deposition process instead of the power level, as in Example 3. The change in the ratio between said two gases is schematically shown in FIG. 10. In said FIG. 10, five lines are shown which represent the gas composition at t=0, at the beginning of the deposition process, at t=0.2 after 20% of the deposition period, t=0.4 after 40% of the deposition period, to t=1, the end of the deposition period. During the deposition of a layer, the gas composition at the location of the plasma is maintained at a constant level over a large part of the substrate tube. In an end region, the gas composition at the location of the plasma is different from the rest of the substrate tube. Said difference in the gas composition in the end region does not take place at the beginning of the deposition process, at t=0, or at the end of the deposition process, at t=1. Between said moments, the gas composition in an end region is varied so that variations in the α-value in the end region are minimised.

From the figures it follows that the geometrical taper can be reduced by using the present invention. In addition to that it is apparent that it is possible to produce preforms in which the deviation in relation to the average value of the profile shape parameter α remain does not exceed+0.02 over a length of 100 cm. In addition to that, the variation in the refractive index contrast can be reduced to a value not exceeding ±1.5% over a length of more than 100 cm. The preform thus produced was subsequently drawn into an optical fibre having a core diameter of about 62.5 μm and the refractive index contrast of about 0.02, after which optical fibres having a length of at least 10 km could be formed, wherein the variation in the α-value did not exceed a value of ±0.01 over the entire fibre length. This result indicates that a nearly constant bandwidth is obtained over the entire length of the optical fibre. Corresponding results were obtained with a graded index-type preform and fibres having a core diameter of about 50 μm and a refractive index contrast of about 0.01.

The invention claimed is:

1. An improved optical fiber preform for manufacturing an optical fiber, said preform comprising:
   a collapsed substrate tube having (i) an axial, deposited-glass-layer core, wherein the length of said axial, deposited-glass-layer core measures 100 cm or more and (ii) a glass cladding surrounding said deposited-glass-layer core;
   wherein, along a continuous preform section constituting at least about 60 percent of the length of said deposited-glass-layer core, the variation in the refractive index contrast between said deposited-glass-layer core and said glass cladding does not exceed an absolute value of 2%.

2. The preform according to claim 1 wherein the variation in the refractive index contrast does not exceed an absolute value of 1.5%.

3. An improved optical fiber preform for manufacturing an optical fiber, said preform comprising:
   a collapsed substrate tube having (i) an axial, deposited-glass-layer cores, wherein the length of said axial, deposited-glass-layer core measures 100 cm or more and (ii) a glass cladding surrounding said deposited-glass-layer core;
   wherein, along a continuous preform section constituting at least about 75 percent of the length of said deposited-glass-layer core, the deviation in relation to the average value of the profile parameter α between said deposited-glass-layer core and said glass cladding does not exceed an absolute value of 0.03.

4. The preform according to claim 3, wherein the deviation in relation to the average value of the profile parameter α does not exceed an absolute value of 0.015.

5. An optical fibre, wherein the deviation from the average value of the profile shape parameter α is maximally about 0.015 for an optical fibre having a length of at least 10 km.

6. The preform according to claim 1, wherein, along a continuous preform section that constitutes at least about 90 percent of the length of said deposited-glass-layer core, the variation in refractive index contrast between said deposited-glass-layer core and said glass cladding does not exceed an absolute value of two percent.

7. The preform according to claim 6, wherein said continuous preform section measures 100 cm or more.

8. A collapsed substrate tube having reduced refractive index contrast variation, the collapsed substrate tube comprising:
   an axial, deposited-glass-layer core, wherein the length of said axial deposited-glass-layer core measures at least 100 cm; and
   a glass cladding surrounding said deposited-glass-layer core;
   wherein, along a continuous section of said deposited-glass-layer core that constitutes at least about 60 percent of its length, the variation in refractive index contrast between said deposited-glass-layer core and said glass cladding does not exceed an absolute value of two percent.

9. The collapsed substrate tube according to claim 8, wherein, along a continuous section that constitutes at least about 90 percent of the length of said deposited-glass-layer core, the variation in refractive index contrast between said deposited-glass-layer core and said glass cladding does not exceed an absolute value of two percent.

10. The collapsed substrate tube according to claim 9, wherein said continuous section measures 100 cm or more.

11. The collapsed substrate tube according to claim 8, wherein, along said continuous section of said axial, deposited-glass-layer core, the variation in refractive index contrast does not exceed an absolute value of 1.5 percent.

12. A preform for manufacturing an optical fiber, said preform comprising:
   a collapsed substrate tube having (i) an axial, deposited-glass-layer core measuring at least 60 cm and (ii) a glass cladding surrounding said deposited-glass-layer core;
   wherein the variation in refractive index contrast between said deposited-glass-layer core and said glass cladding has an absolute value of two percent or less.

13. A collapsed substrate tube having improved refractive index contrast variation along its length, the collapsed substrate tube comprising:
   a collapsed substrate tube having reduced variation with respect to refractive index contrast comprising an axial, deposited-glass-layer core measuring at least 60 cm and a glass cladding surrounding said deposited-glass-layer core,
   wherein the variation in refractive index contrast between said deposited-glass-layer core and said glass cladding has an absolute value of two percent or less.

14. The preform according to claim 3, wherein, along a continuous preform section that constitutes at least about 90 percent of the length of said deposited-glass-layer core, the deviation in relation to the average value of the profile parameter α between said deposited-glass-layer core and said glass cladding does not exceed an absolute value of 0.03.

15. The preform according to claim 14, wherein said continuous preform section measures 100 cm or more.

16. A collapsed substrate tube having improved profile parameter α variation along its length, the collapsed substrate tube comprising:
   an axial, deposited-glass-layer core, wherein the length of said axial, deposited-glass-layer core measures at least 100 cm; and
   a glass cladding surrounding said deposited-glass-layer core;
   wherein, along a continuous section of said deposited-glass-layer core that constitutes at least about 75 percent of its length, the deviation in relation to the average value of the profile parameter α between said deposited-glass-layer core and said glass cladding does not exceed an absolute value of 0.03.

17. The collapsed substrate tube according to claim 16, wherein, along a continuous section that constitutes at least about 90 percent of the length of said deposited-glass-layer core, the deviation in relation to the average value of the profile parameter $\alpha$ between said deposited-glass-layer core and said glass cladding does not exceed an absolute value of 0.03.

18. The collapsed substrate tube according to claim 17, wherein said continuous section measures 100 cm or more.

19. The collapsed substrate tube according to claim 16, wherein along said continuous section of said axial, deposited-glass-layer core, the deviation in relation to the average value of the profile parameter $\alpha$ does not exceed an absolute value of 0.015.

20. A preform for manufacturing an optical fiber, said preform comprising:
   a collapsed substrate tube having (i) an axial, deposited-glass-layer core measuring at least 80 cm and (ii) a glass cladding surrounding said deposited-glass-layer core;
   wherein the deviation in relation to the average value of a profile parameter cx between said deposited-glass-layer core and said glass cladding does not exceed an absolute value of 0.03.

21. A collapsed substrate tube having improved profile parameter $\alpha$ variation along its length, the collapsed substrate tube comprising:
   a collapsed substrate tube having reduced variation with respect to a profile parameter $\alpha$ comprising an axial, deposited-glass-layer core measuring at least 80 cm and a glass cladding surrounding said deposited-glass-layer core,
   wherein the deviation in relation to the average value of the profile parameter $\alpha$ between said deposited-glass-layer core and said glass cladding does not exceed an absolute value of 0.03.

* * * * *

UNITED STATES PATENT AND TRADEMARK OFFICE
CERTIFICATE OF CORRECTION

PATENT NO. : 7,522,800 B2
APPLICATION NO. : 11/414376
DATED : April 21, 2009
INVENTOR(S) : Igor Milicevic et al.

It is certified that error appears in the above-identified patent and that said Letters Patent is hereby corrected as shown below:

In the Claims:

Claim 3, column 9, line 44 reads "glass-layer ~~cores~~, wherein the length of said axial," and should read "glass-layer core, wherein the length of said axial,"

Claim 19, column 11, line 13 reads "value of the profile parameter ~~αdoes~~ not exceed an absolute" and should read "value of the profile parameter $\alpha$ does not exceed an absolute"

Claim 20, column 12, line 2 reads "profile parameter ~~ex~~ between said deposited-glass-layer" and should read "profile parameter $\alpha$ between said deposited-glass-layer"

Signed and Sealed this

Twenty-ninth Day of December, 2009

David J. Kappos
*Director of the United States Patent and Trademark Office*